United States Patent
Kim et al.

(10) Patent No.: US 11,022,201 B1
(45) Date of Patent: Jun. 1, 2021

(54) POWER TRAIN FOR ELECTRIC VEHICLE

(71) Applicants: Hyundai Motor Company, Seoul (KR); Kia Motors Corporation, Seoul (KR)

(72) Inventors: Jin Ho Kim, Suwon-Si (KR); Jae Joon Lee, Anyang-Si (KR); Jong Sool Park, Hwaseong-Si (KR); Jin Young Hwang, Yongin-Si (KR); Jong Sung Kim, Incheon (KR)

(73) Assignees: Hundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/884,332

(22) Filed: May 27, 2020

(30) Foreign Application Priority Data

Dec. 12, 2019  (KR) .......................... 10-2019-0165277

(51) Int. Cl.
| | |
|---|---|
| *F16H 3/66* | (2006.01) |
| *B60K 17/02* | (2006.01) |
| *F16H 37/04* | (2006.01) |
| *B60K 1/02* | (2006.01) |

(Continued)

(52) U.S. Cl.
CPC ............... *F16H 3/66* (2013.01); *B60K 17/02* (2013.01); *F16H 37/046* (2013.01); *B60K 1/02* (2013.01); *F16H 2003/445* (2013.01); *F16H 2037/047* (2013.01); *F16H 2057/02034* (2013.01); *F16H 2200/0052* (2013.01); *F16H 2200/2005* (2013.01); *F16H 2200/2094* (2013.01)

(58) Field of Classification Search
CPC .... F16H 3/66; F16H 37/046; F16H 2037/047; F16H 2003/445; F16H 2200/2094; F16H 2200/2005; F16H 2200/0052; F16H 2057/2034; B60K 1/02
USPC .................................................. 475/207, 218
See application file for complete search history.

(56) References Cited

U.S. PATENT DOCUMENTS

| | | | |
|---|---|---|---|
| 5,775,449 A | 7/1998 | Moroto et al. | |
| 9,260,109 B2 * | 2/2016 | Tanaka | B60W 20/30 |
| 9,346,462 B2 | 5/2016 | Park | |

(Continued)

FOREIGN PATENT DOCUMENTS

| | | |
|---|---|---|
| KR | 10-2013-0117184 A | 10/2013 |
| KR | 10-2014-0118028 A | 10/2014 |

OTHER PUBLICATIONS

U.S. Appl. No. 16/887,267, filed May 29, 2020.

(Continued)

*Primary Examiner* — Roger L Pang
(74) *Attorney, Agent, or Firm* — Morgan, Lewis & Bockius LLP

(57) ABSTRACT

A power train for an electric vehicle may include a planetary gear set including three rotation elements having a first rotation element, a second rotation element and a third rotation element, wherein the first rotation element is connected to a first shaft, the second rotation element is connected to a second shaft, and the third rotation element is connected to a third shaft; a first motor mounted to selectively supply power to the first shaft in two or more gear ratios; and a second motor mounted to selectively supply power to the first shaft in two or more gear ratios. The third shaft is configured to be fixed to a transmission housing, and any two of the first shaft, the second shaft, and the third shaft are configured to be coupled to each other.

11 Claims, 4 Drawing Sheets

(51) Int. Cl.
    *F16H 57/02*     (2012.01)
    *F16H 3/44*     (2006.01)

(56)     References Cited

U.S. PATENT DOCUMENTS

| | | |
|---|---|---|
| 9,528,583 B2 | 12/2016 | Lubke et al. |
| 2003/0100395 A1 | 5/2003 | Hiraiwa |
| 2006/0025272 A1 | 2/2006 | Pelouch |
| 2007/0149334 A1 | 6/2007 | Holmes et al. |
| 2008/0108467 A1 | 5/2008 | Hiraki et al. |
| 2008/0194369 A1 | 8/2008 | Boutou et al. |
| 2008/0200296 A1 | 8/2008 | Holmes |
| 2009/0151491 A1 | 6/2009 | Tabata et al. |
| 2010/0051360 A1* | 3/2010 | Oba ............... F16D 27/12 180/65.22 |
| 2010/0160103 A1 | 6/2010 | Holmes |
| 2015/0068336 A1 | 3/2015 | Peterson |
| 2016/0167639 A1 | 6/2016 | Hori et al. |
| 2016/0312857 A1 | 10/2016 | Wechs |
| 2017/0009862 A1 | 1/2017 | Gumpoldsberger |
| 2017/0159779 A1 | 6/2017 | Hwang |
| 2017/0282700 A1* | 10/2017 | Bergquist ............... B60K 6/547 |
| 2018/0099561 A1 | 4/2018 | Xu et al. |
| 2019/0118635 A1 | 4/2019 | Hwang |
| 2020/0047602 A1 | 2/2020 | Chae |

OTHER PUBLICATIONS

U.S. Appl. No. 16/882,299, filed May 22, 2020.
U.S. Appl. No. 16/884,306, filed May 27, 2020.
U.S. Appl. No. 16/993,436, filed Aug. 14, 2020.

\* cited by examiner

FIG. 4

| GEAR-SHIFT STAGE | S1 | | S2 | | S3 | |
|---|---|---|---|---|---|---|
| | a | b | c | d | e | f |
| 1 | ● | | ● | | ● | |
| 2 | | ● | ● | | ● | |
| 3 | | ● | | ● | ● | |
| 4 | ● | | ● | | | ● |
| 5 | | ● | ● | | | ● |
| 6 | | ● | | ● | | ● |

US 11,022,201 B1

POWER TRAIN FOR ELECTRIC VEHICLE

CROSS REFERENCE TO RELATED APPLICATION

The present application claims priority to Korean Patent Application No. 10-2019-0165277, filed Dec. 12, 2019, the entire contents of which is incorporated herein for all purposes by this reference.

BACKGROUND OF THE INVENTION

Field of the Invention

The present invention relates to a power train mounted on an electric vehicle.

Description of Related Art

An electric vehicle, which is a vehicle using an electric motor to supply power for a driving force of the vehicle, does not generate exhaust gas. Thus, the electric vehicle may contribute greatly as a solution to environmental pollution in large cities.

To popularize the electric vehicle as described above, it is required to improve various technologies. In particular, there is a demand for technologies capable of drastically improving an allowable travelling distance after a one-time charge.

To increase the allowable travelling distance as described above, it is necessary to not only improve power efficiency (a travelling distance per unit power, km/kWh) while the motor mounted on the electric vehicle has a reduced size and volume but also satisfy the maximum hill-climbing ability and the best speed performance required for the vehicle. Thus, a transmission is mounted to do so.

For the reason described above, the transmission mounted on the electric vehicle is capable of not only achieving high power transmission efficiency while having a configuration as simple as possible, but also not causing a torque interruption, by which a torque to be transferred to a driving wheel is disconnected, and a gear-shift shock at the time of gear shifting.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power train for an electric vehicle configured for: not only providing a plurality of gear-shift ratios, making it possible to reduce a volume of a motor, but also satisfying the maximum hill-climbing ability and the best speed performance required for the vehicle; achieving high power transmission efficiency while having a relatively simple configuration and a small weight, improving power efficiency of the vehicle; and reducing or preventing a torque interruption and a gear-shift shock.

According to an exemplary embodiment of the present invention, a power train for an electric vehicle includes: a planetary gear set including three rotation elements having a first rotation element, a second rotation element and a third rotation element, wherein the first rotation element is connected to a first shaft and the second rotation element is connected to a second shaft; a first motor mounted to selectively supply power to the first shaft in two or more gear ratios; and a second motor mounted to selectively supply power to the first shaft in two or more gear ratios.

A third rotation element of the planetary gear set may be selectively connectable to a transmission housing; and any two rotation elements of the three rotation elements of the planetary gear set may be selectively connectable to each other to rotate a whole of the planetary gear set integrally.

A first transmission device may be provided between the first motor and the first shaft to selectively switch between a state in which the power of the first motor is transferred directly to the first shaft and a state in which the power of the first motor is transferred to the first shaft after being gear-shifted through a gear train.

A rotation shaft of the first motor may be mounted to be coaxial with the first shaft; the first transmission device may include a gear engagement mechanism having a hub and a sleeve on the rotation shaft of the first motor; a first gear having a clutch gear may be rotatably mounted on the rotation shaft of the first motor, the clutch gear of the first gear being selectively engageable with the sleeve of first transmission device; and a second gear having a clutch gear may be fixedly mounted on the first shaft, the clutch gear of the second gear being engaged with the sleeve of the gear engagement mechanism.

A third gear externally engaged with the first gear and a fourth gear externally engaged with the second gear may be coaxially connected to each other.

A first transmission device may be provided between the first motor and the first shaft to transfer the power of the first motor to the first shaft through any one of two external gear trains in which gears are externally engaged with each other in different gear ratios.

The first transmission device may include a gear engagement mechanism having a hub and a sleeve mounted on a rotation shaft of the first motor; a first gear and a second gear may be rotatably mounted on both sides of the hub, respectively; a third gear externally engaged with the first gear and a fourth gear externally engaged with the second gear may be coaxially connected to each other; a fifth gear may be mounted on a shaft for the third gear and the fourth gear in a rotation-constrained state; and a sixth gear externally engaged with the fifth gear may be fixedly mounted on the first shaft.

A second transmission device may be provided between the second motor and the first shaft to selectively switch between a state in which the power of the second motor is transferred directly to the first shaft and a state in which the power of the second motor is transferred to the first shaft after being gear-shifted through a gear train.

A rotation shaft of the second motor may be mounted to be coaxial with the first shaft; the second transmission device may include a gear engagement mechanism having a hub and a sleeve on the first shaft; a seventh gear having a clutch gear may be fixedly mounted on the rotation shaft of the second motor, the clutch gear of the seventh gear being selectively engageable with the sleeve of the second transmission device; and an eighth gear having a clutch gear may be fixedly mounted on the first shaft, the clutch gear of the eighth gear being engageable with the sleeve of the second transmission device.

A ninth gear externally engaged with the seventh gear and a tenth gear externally engaged with the eighth gear may be coaxially connected to each other.

A second transmission device may be provided between the second motor and the first shaft to transfer the power of the second motor to the first shaft through any one of two external gear trains in which gears are externally engaged with each other in different gear ratios.

An eleventh gear may be fixedly mounted on a rotation shaft of the second motor; a twelfth gear and a thirteenth gear may be fixedly mounted on the first shaft; a fourteenth gear externally engaged with the eleventh gear, a fifteenth gear externally engaged with the twelfth gear, and a sixteenth gear externally engaged with the thirteenth gear may be aligned to be coaxial with each other; and the second transmission device may include a gear engagement mechanism having a hub and a sleeve between the fifteenth gear and the sixteenth gear.

A third transmission device fixing the third rotation element of the planetary gear set to the transmission housing or connecting the third rotation element of the planetary gear set to the second shaft by linear displacement of the first shaft along an axial direction thereof may be included.

According to various exemplary embodiments of the present invention, a power train for an electric vehicle includes: a planetary gear set including three rotation elements having a first rotation element, a second rotation element and a third rotation element, wherein the first rotation element is connected to a first shaft, the second rotation element is connected to a second shaft, and the third rotation element is connected to a third shaft; a first motor mounted to selectively supply power to the first shaft in two or more gear ratios; and a second motor mounted to selectively supply power to the first shaft in two or more gear ratios. The third shaft may be configured to be fixed to a transmission housing, and any two of the first shaft, the second shaft, and the third shaft may be configured to be coupled to each other.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a chart summarizing operation modes of the power trains for electric vehicles according to an exemplary embodiment of the present invention.

Figure 1:
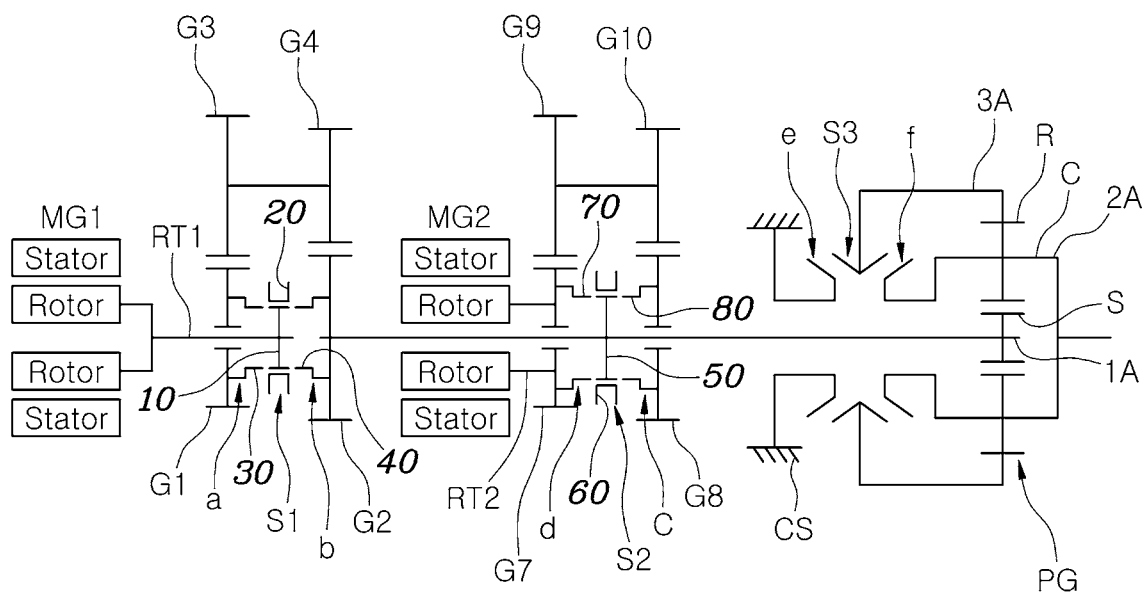
FIG. 1 is a view exemplarily illustrating various exemplary embodiments of a power train for an electric vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
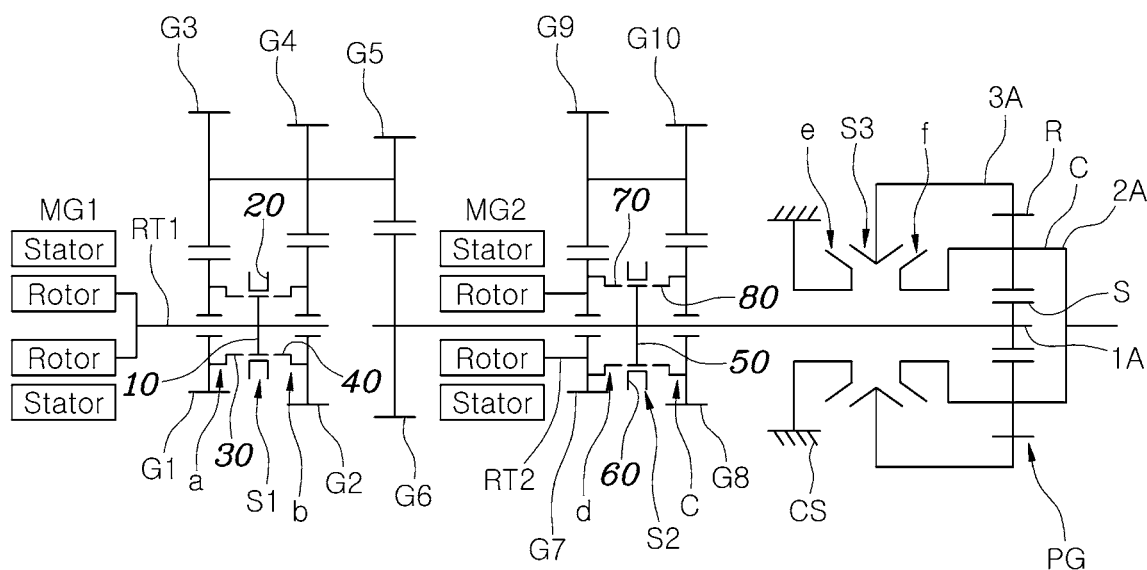
FIG. 2 is a view exemplarily illustrating various exemplary embodiments of a power train for an electric vehicle according to an exemplary embodiment of the present invention.
Figure 3:
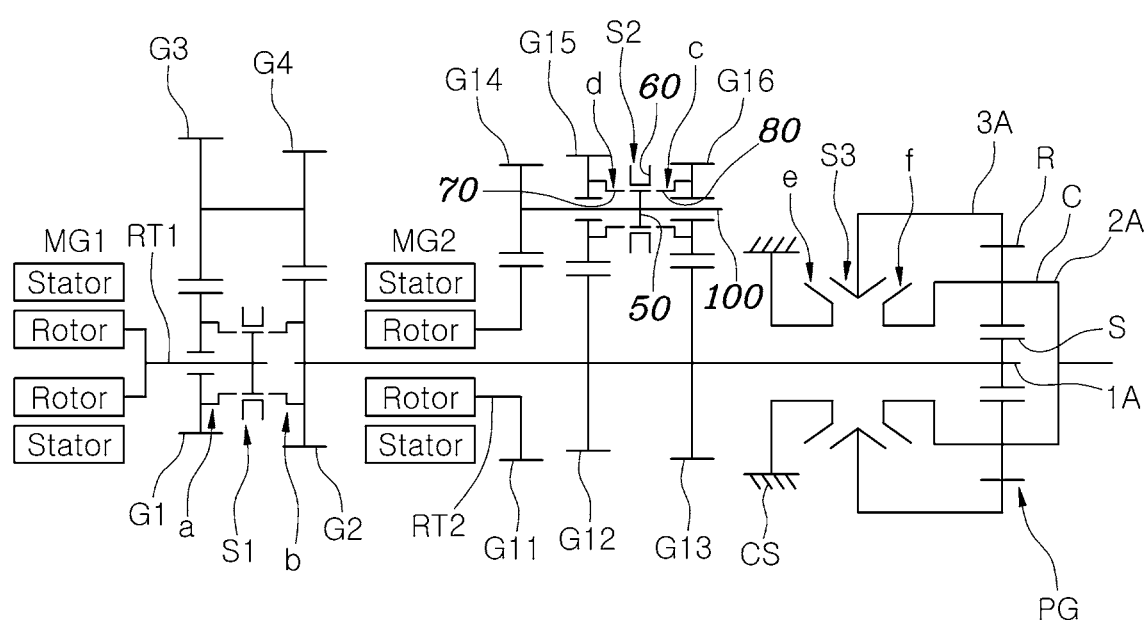
FIG. 3 is a view exemplarily illustrating various exemplary embodiments of a power train for an electric vehicle according to an exemplary embodiment of the present invention.

Referring to FIG. 1, FIG. 2, and FIG. 3, embodiments of power trains for electric vehicles according to an exemplary embodiment of the present invention share in common: a planetary gear set PG including three rotation elements having a first rotation element, a second rotation element and a third rotation element, wherein the first rotation element is connected to a first shaft 1A and the second rotation element is connected to a second shaft 2A; a first motor MG1 mounted to selectively supply power to the first shaft 1A in two or more gear ratios; and a second motor MG2 mounted to selectively supply power to the first shaft 1A in two or more gear ratios.

A third rotation element of the planetary gear set PG is connected to a third shaft 3A, and may be selectively connectable to a transmission housing.

Furthermore, any two of the three rotation elements of the planetary gear set PG may be selectively connectable to each other to rotate a whole of the planetary gear set PG integrally.

Here, when the first shaft 1A is considered as an input shaft receiving power from the first motor MG1 and the second motor MG2, and the second shaft 2A is considered as an output shaft outputting power changed after being gear-shifted, it may be considered in an exemplary embodiment of the present invention that the power supplied in an adjustable manner from the first motor MG1 and the second motor MG2 to the input shaft is adjusted again through the planetary gear set PG and the adjusted power is outputted to the output shaft.

For reference, the first shaft 1A, the second shaft 2A, and the third shaft 3A, all of which are rotation shafts of the rotation elements of the planetary gear set PG, are mounted to be coaxial with each other. In the planetary gear set PG, the first rotation element may be expressed as a sun gear S, the second rotation element may be expressed as a carrier C, and the third rotation element may be expressed as a ring gear R.

The exemplary embodiments of the present invention share in common a third transmission device S3 fixing the third rotation element of the planetary gear set PG to the transmission housing CS or connecting the third rotation element of the planetary gear set PG to the second shaft 2A by linear displacement of the first shaft 1A along an axial direction thereof.

The third rotation element of the planetary gear set PG is connected to the second rotation element through the second shaft 2A, so that all the rotation elements of the planetary gear set PG may be integrally rotated.

Of course, not only when the third shaft 3A is connected to the second shaft 2A as described above, but also when the third shaft 3A is connected to the first shaft 1A or the first shaft 1A and the second shaft 2A are connected to each other, all the rotation elements of the planetary gear set PG may be integrally rotated.

The third transmission device S3 may be configured as a friction clutch or the like to switch between a state in which the third rotation element of the planetary gear set PG connected to the third shaft 3A is connected to the transmission housing CS and a state in which the third rotation element of the planetary gear set PG is connected to the second shaft 2A by forming the linear displacement by linear sliding along the axial direction thereof in a state in which rotation with respect to the third shaft 3A is constrained.

In the various exemplary embodiments of FIG. 1, a first transmission device S1 is provided between the first motor MG1 and the first shaft 1A to switch between a state in which the power of the first motor MG1 is transferred directly to the first shaft 1A and a state in which the power of the first motor MG1 is transferred to the first shaft 1A after being gear-shifted through a gear train.

A rotation shaft RT1 of the first motor MG1 is mounted to be coaxial with the first shaft 1A; the first transmission device S1 includes a gear engagement mechanism having a hub 10 and a sleeve 20 on the rotation shaft RT1 of the first motor MG1; a first gear G1 having a clutch gear 30 is rotatably mounted on the rotation shaft RT1 of the first motor MG1, the clutch gear 30 of the first gear G1 being engaged with the sleeve 20 of the gear engagement mechanism; and a second gear G2 having a clutch gear 40 is mounted in a rotation-constrained state on the first shaft 1A, the clutch gear 40 of the second gear G2 being engaged with the sleeve 20 of the gear engagement mechanism.

Thus, the first transmission device S1 substantially includes the gear engagement mechanism provided on the rotation shaft of the first motor MG1, the clutch gear of the first gear G1, the clutch gear of the second gear G2, etc.

A third gear G3 externally engaged with the first gear G1 and a fourth gear G4 externally engaged with the second gear G2 are coaxially connected to each other.

When the sleeve of the first transmission device S1 is engaged with the clutch gear of the first gear G1, the power of the first motor MG1 is transferred to the first shaft 1A after passing sequentially through the first gear G1, the third gear G3, the fourth gear G4, and the second gear G2. When the sleeve of the first transmission device S1 is engaged with the clutch gear of the second gear G2, the power of the first motor MG1 is transferred directly to the first shaft 1A. Therefore, the power of the first motor MG1 may be transferred to the first shaft 1A in different gear-shift ratios.

The configuration of the first transmission device S1 described above is applied in common to the various exemplary embodiments of FIG. 3.

Meanwhile, the various exemplary embodiments of FIG. 2 is different in that a first transmission device S1 is provided between the first motor MG1 and the first shaft 1A to transfer the power of the first motor MG1 to the first shaft 1A through any one of two external gear trains in which gears are externally engaged with each other in different gear ratios.

The first transmission device S1 includes a gear engagement mechanism having a hub 10 and a sleeve 20 on the rotation shaft RT1 of the first motor MG1; a first gear G1 and a second gear G2 are rotatably mounted on both sides of the hub 10, respectively; a third gear G3 externally engaged with the first gear G1 and a fourth gear G4 externally engaged with the second gear G2 are coaxially connected to each other; a fifth gear G5 is mounted on a shaft for the third gear G3 and the fourth gear G4 in a rotation-constrained state; and a sixth gear G6 externally engaged with the fifth gear G5 is mounted on the first shaft 1A in a rotation-constrained state.

When the sleeve 20 of the first transmission device S1 is engaged with a clutch gear 30 of the first gear G1, the power of the first motor MG1 is transferred to the first shaft 1A after passing sequentially through the first gear G1, the third gear G3, the fifth gear G5, and the sixth gear G6. When the sleeve 20 of the first transmission device S1 is engaged with a clutch gear 40 of the second gear G2, the power of the first motor MG1 is transferred to the first shaft 1A through the second gear G2, the fourth gear G4, the fifth gear G5, and the sixth gear G6. Therefore, the power of the first motor MG1 may be transferred to the first shaft 1A in different gear ratios.

Next, the various exemplary embodiments of FIG. 1 and the various exemplary embodiments of FIG. 2 share the same configuration of the second transmission device, while various exemplary embodiments of FIG. 3 employs a different configuration of the second transmission device therefrom. In the various exemplary embodiments of FIG. 1 and the various exemplary embodiments of FIG. 2 of the present invention, the second transmission device S2 is provided between the second motor MG2 and the first shaft 1A to switch between a state in which the power of the second motor MG2 is transferred directly to the first shaft 1A and a state in which the power of the second motor MG2 is transferred to the first shaft 1A after being gear-shifted through a gear train.

A rotation shaft of the second motor MG2 is mounted to be coaxial with the first shaft 1A; the second transmission device S2 includes a gear engagement mechanism having a hub 50 and a sleeve 60 on the first shaft 1A; a seventh gear G7 having a clutch gear 70 is mounted in a rotation-constrained state on the rotation shaft RT2 of the second motor MG2, the clutch gear 70 of the seventh gear G7 being engaged with the sleeve 60 of the gear engagement mechanism; and an eighth gear G8 having a clutch gear 80 is mounted in a rotation-constrained state on the first shaft 1A, the clutch gear 80 of the eighth gear G8 being engaged with the sleeve RT2 of the gear engagement mechanism.

A ninth gear G9 externally engaged with the seventh gear G7 and a tenth gear G10 externally engaged with the eighth gear G8 are coaxially connected to each other.

When the sleeve of the second transmission device S2 is engaged with the clutch gear of the seventh gear G7, the power of the second motor MG2 is transferred to the first shaft 1A directly through the sleeve and the hub. When the sleeve of the second transmission device S2 is engaged with the clutch gear of the eighth gear G8, the power of the second motor MG2 is transferred to the first shaft 1A through the seventh gear G7, the ninth gear G9, the tenth gear G10, and the eighth gear G8.

In contrast, in the various exemplary embodiments of FIG. 3, the second transmission device S2 is mounted to transfer the power of the second motor MG2 to the first shaft 1A through any one of two external gear trains in which gears are externally engaged with each other in different gear ratios.

That is, an eleventh gear G11 is mounted on the rotation shaft RT2 of the second motor MG2 in a rotation-constrained state; a twelfth gear G12 and a thirteenth gear G13 are mounted on the first shaft 1A in a rotation-constrained state; a fourteenth gear G14 fixed to a rotation shaft 100 and externally engaged with the eleventh gear G11, a fifteenth gear G15 externally engaged with the twelfth gear G12, and a sixteenth gear G16 externally engaged with the thirteenth gear G13 are aligned to be coaxial with each other; and the second transmission device S2 includes a gear engagement mechanism having a hub 50 and a sleeve between the fifteenth gear G15 and the sixteenth gear G16 rotatably mounted on the rotation shaft 100.

Of course, each of the fifteenth gear G15 and the sixteenth gear G16 has a clutch gear 70 engaged with the sleeve of the gear engagement mechanism.

When the sleeve 60 of the second transmission device S2 is engaged with the clutch gear 70 of the fifteenth gear G15, the power of the second motor MG2 is transferred to the first shaft 1A through the eleventh gear G11, the fourteenth gear G14, the fifteenth gear G15, and the twelfth gear G12. When the sleeve 60 of the second transmission device S2 is engaged with the clutch gear 80 of the sixteenth gear G16, the power of the second motor MG2 is transferred to the first shaft 1A through the eleventh gear G11, the fourteenth gear G14, the sixteenth gear G16, and the thirteenth gear G13.

Figure 4:
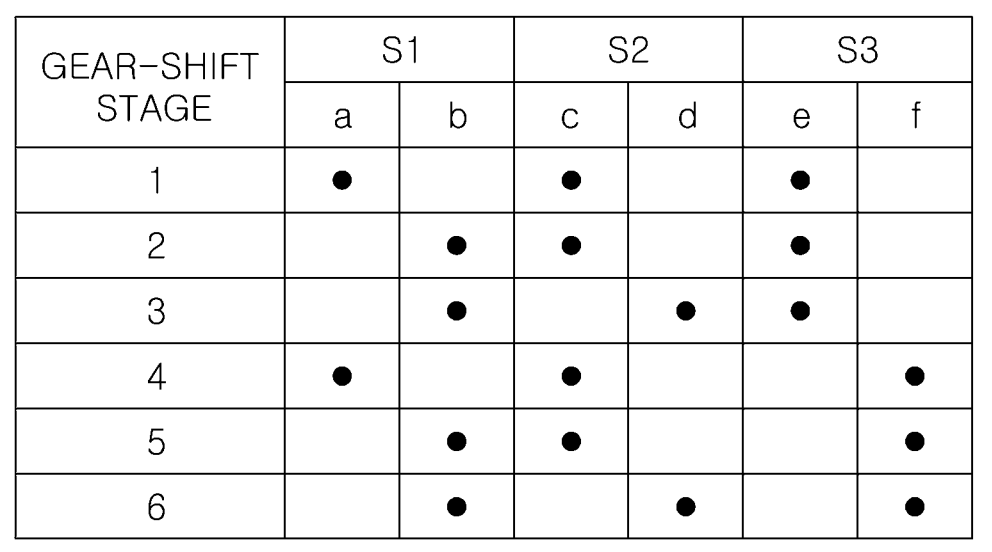

FIG. 4 is a chart summarizing operation modes in the exemplary embodiments of the power trains for electric vehicles according to an exemplary embodiment of the present invention as described above, each operation mode being implemented in a total of six gear-shifting stages.

For reference, in FIG. 4, "a" is for expressing that the sleeve of the first transmission device S1 is configured to connect or disconnect power to/from the clutch gear of the first gear G1, "b" is for expressing that the sleeve of the first transmission device S1 is configured to connect or disconnect power to/from the clutch gear of the second gear G2, "c" is for expressing that the sleeve of the second transmission device S2 is configured to connect or disconnect power to/from the clutch gear of the eighth gear G8, "d" is for expressing that the sleeve of the second transmission device S2 is configured to connect or disconnect power to/from the clutch gear of the seventh gear G7, "e" is for expressing that the third transmission device S3 is configured to connect or disconnect the third rotation element of the planetary gear set PG to/from the transmission housing CS, and "f" is for expressing that the third transmission device S3 is configured to connect or disconnect the third rotation element of the planetary gear set PG to/from the second shaft 2A.

However, the various exemplary embodiments of FIG. 3 is different from the various exemplary embodiments in that "c" is for expressing that the sleeve of the second transmission device S2 is configured to connect or disconnect power to/from the clutch gear of the sixteenth gear G16, and "d" is for expressing that the sleeve of the second transmission device S2 is configured to connect or disconnect power to/from the clutch gear of the fifteenth gear G15.

The implementation of the gear-shifting stages in the power train for an electric vehicle according to an exemplary embodiment of the present invention and the gear shifting process will be described based on the various exemplary embodiments of FIG. 1. of course, the gear shifting processes in the second and various exemplary embodiments of FIG. 2 and FIG. 3 are performed in almost the same manner as that in the various exemplary embodiments.

The first gear-shifting stage is implemented by fixing the third rotation element of the planetary gear set PG to the transmission housing CS, engaging the sleeve of the first transmission device S1 with the clutch gear of the first gear G1, and engaging the sleeve of the second transmission device S2 with the clutch gear of the eighth gear G8.

In the instant case, the power of the first motor MG1 is transferred to the first shaft 1A through the first gear G1, the third gear G3, the fourth gear G4, and the second gear G2, and the power of the second motor MG2 is transferred to the first shaft 1A through the seventh gear G7, the ninth gear G9, the tenth gear G10, and the eighth gear G8.

In the first gear-shifting stage, both the power of the first motor MG1 and the power of the second motor MG2 may be transferred to the first shaft 1A. Thus, it is of course possible to implement a first-gear driving state by only using any one motor depending on driving circumstances of the vehicle.

Since the ring gear R, which is the third rotation element of the planetary gear set PG, is fixed to the transmission housing CS by the third transmission device S3 as described above, the power transferred to the first shaft 1A is inputted to the sun gear S, which is the first rotation element, and then outputted to the second shaft 2A after decelerating through the carrier C, which is the second rotation element.

Of course, the second shaft 2A is connected to a driving wheel through a separate differential gear device or the like, such that the vehicle may be driven by the power changed after being gear-shifted as described above.

The first gear-shifting stage is shifted to a second gear-shifting stage by releasing the sleeve of the first transmission device S1 from the clutch gear of the first gear G1 and engaging the sleeve of the first transmission device S1 with the clutch gear of the second gear G2.

However, to achieve smooth gear shifting without a torque interruption and a gear-shift shock, in a state in which a torque of the first motor MG1 is lowered while the second motor MG2 continues to supply power, the sleeve of the first transmission device S1 is released to leave the vehicle in neutral and then engaged again with the clutch gear of the second gear G2.

That is, even in a state in which the sleeve of the first transmission device S1 is released to leave the vehicle in neutral, the power of the second motor MG2 is continuously supplied to the first shaft 1A, and accordingly, a torque is continuously transferred to the driving wheel, preventing a torque interruption. The torque of the first motor MG1 is lowered or completely released during the process of releasing and engaging the sleeve of the first transmission device S1, easily and smoothly releasing and engaging the sleeve of the first transmission device S1 and thus securing a superior gear-shifting quality.

In the second gear-shifting stage described above, the power of the first motor MG1 is transferred directly to the first shaft 1A by the sleeve of the first transmission device S1 and the second gear G2 and then outputted to the second shaft 2A after decelerating in the planetary gear set PG.

The second gear-shifting stage is shifted to a third gear-shifting stage by releasing the sleeve of the second transmission device S2 from the clutch gear of the eighth gear G8 and engaging the sleeve of the second transmission device S2 with the clutch gear of the seventh gear G7.

Likewise, to achieve smooth gear shifting without a torque interruption and a gear-shift shock, in a state in which a torque of the second motor MG2 is lowered or released while the first motor MG1 continues to supply power to the first shaft 1A, the sleeve of the second transmission device S2 is released from the clutch gear of the eighth gear G8 to leave the vehicle in neutral and then engaged again with the clutch gear of the seventh gear G7.

Accordingly, while the power from the first motor MG1 is continuously supplied to the driving wheel, the state in which the sleeve of the second transmission device S2 is engaged with the clutch gear of the eighth gear G8 is smoothly switched to the state in which the sleeve of the second transmission device S2 is engaged with the clutch gear of the seventh gear G7. Accordingly, the gear shifting to the third gear-shifting stage is completed.

In the third gear-shifting stage, the power of the first motor MG1 is inputted to the sun gear S of the planetary gear set PG through the first shaft 1A. Also, the power of the second motor MG2 is transferred directly to the first shaft 1A through the seventh gear G7 and through the sleeve and the hub of the second transmission device S2, and then inputted to the sun gear S of the planetary gear set PG.

Therefore, in the third gear-shifting stage, the power of the first motor MG1 and the power of the second motor MG2 are inputted to the sun gear through the first shaft 1A without gear shifting, and then outputted through the shaft 2A after decelerating only in the planetary gear set PG.

In a fourth gear-shifting stage, while the first transmission device S1 and the second gear S2 are implemented in the same manner as in the first gear-shifting stage, the third transmission device S3 connects the ring gear, which is the third rotation element of the planetary gear set PG, to the carrier of the second shaft 2A.

Accordingly, all the rotation elements of the planetary gear set PG are integrally rotated. Thus, the power of the first motor MG1 is transferred to the first shaft 1A after decelerating through the first gear G1, the third gear G3, the fourth gear G4, and the second gear G2, and the power of the second motor MG2 is transferred to the first shaft 1A after decelerating through the seventh gear G7, the ninth gear G9, the tenth gear G10, and the eighth gear G8. The transferred power is outputted directly through the shaft 2A without decelerating in the planetary gear set PG.

Subsequently, the fourth gear-shifting stage is shifted to a fifth gear-shifting stage by releasing the sleeve of the first transmission device S1 from the clutch gear of the first gear G1 and engaging the sleeve of the first transmission device S1 with the clutch gear of the second gear G2 in a state in which the second motor MG2 continues to transfer power to the driving wheel, and the fifth gear-shifting stage is shifted to a sixth gear-shifting stage by lowering the torque of the second motor MG2 and releasing the sleeve of the second transmission device S2 from the clutch gear of the eighth gear G8 and then engaging the sleeve of the second transmission device S2 with the clutch gear of the seventh gear G7 in a state in which the first motor MG1 continues to transfer power to the driving wheel.

The shift from the fourth gear-shifting stage to the fifth gear-shifting stage and the shift from the fifth gear-shifting stage to the sixth gear-shifting stage are also performed in a state in which any one of the first motor MG1 and the second motor MG2 continues to transmit power to the driving wheel as described above, preventing a torque interruption and securing a smooth gear-shifting quality.

Furthermore, the power train for an electric vehicle according to an exemplary embodiment of the present invention as described above is configured to transfer the power of the motor to the drive wheel basically using a conventional automated manual transmission (ATM) mechanism, so that the power transmission efficiency thereof is excellent. In the sixth gear-shifting stage, which is the highest stage, the power of the first motor MG1 and the power of the second motor MG2 are transferred directly to the first shaft 1A, and all the rotation elements of the planetary gear set PG are coupled to each other so that the first shaft 1A may be rotated integrally with the second shaft 2A. As a result, the power of the first motor MG1 and the power of the second motor MG2 are outputted without gear shifting in the power train according to an exemplary embodiment of the present invention, maximizing power efficiency of the electric vehicle with very high power transmission efficiency.

According to an exemplary embodiment of the present invention, it is possible to not only provide a plurality of gear-shift ratios, making it possible to reduce a volume of the motor, but also satisfy the maximum hill-climbing ability and the best speed performance required for the vehicle; it is possible to achieve high power transmission efficiency with a relatively simple configuration and a small weight, improving power efficiency of the vehicle; and it is possible to prevent a torque interruption and a gear-shift shock.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power train apparatus of a vehicle, the power train apparatus comprising:
   a planetary gear set including three rotation elements having a first rotation element, a second rotation element and a third rotation element, wherein the first rotation element is connected to a first shaft and the second rotation element is connected to a second shaft;
   a first motor mounted to selectively supply power to the first shaft in two or more gear ratios; and
   a second motor mounted to selectively supply power to the first shaft in two or more gear ratios,
   wherein a first transmission device is mounted between the first motor and the first shaft to selectively switch between a state in which the power of the first motor is transferred directly to the first shaft and a state in which the power of the first motor is transferred to the first shaft after being gear-shifted through a gear train,
   wherein a rotation shaft of the first motor is mounted to be coaxial with the first shaft, wherein the first transmission device includes a hub and a sleeve mounted on the rotation shaft of the first motor, wherein a first gear having a clutch gear is rotatably mounted on the rotation shaft of the first motor, the clutch gear of the first gear being selectively engageable with the sleeve of the first transmission device, and wherein a second gear having a clutch gear is fixedly mounted on the first shaft, the clutch gear of the second gear being selectively engageable with the sleeve of the first transmission device.

2. The power train apparatus of the vehicle of claim 1, wherein the third rotation element of the planetary gear set is selectively connectable to a transmission housing; and wherein two rotation elements of the three rotation elements of the planetary gear set are selectively connectable to each other to rotate a whole of the planetary gear set integrally.

3. The power train apparatus of the vehicle of claim 2, wherein the two rotation elements of the three rotation elements of the planetary gear set are the second rotation element and the third rotation element.

4. The power train apparatus of the vehicle of claim 3, wherein the first rotation element is a sun gear, the second rotation element is a planet carrier, and the third rotation element is a ring gear.

5. The power train apparatus of the vehicle of claim 1, wherein a third gear engaged with the first gear and a fourth gear engaged with the second gear are coaxially connected to each other.

6. The power train apparatus of the vehicle of claim 1, wherein a second transmission device is mounted between the second motor and the first shaft to selectively transfer the power of the second motor to the first shaft through one of two gear trains including gears engaged with each other in different gear ratios.

7. The power train apparatus of the vehicle of claim 6, wherein the gears include:

an eleventh gear fixedly mounted on a rotation shaft of the second motor;

a twelfth gear and a thirteenth gear fixedly mounted on the first shaft; and a fourteenth gear engaged with the eleventh gear, a fifteenth gear engaged with the twelfth gear, and a sixteenth gear engaged with the thirteenth gear that are aligned to be coaxial with each other, wherein the second transmission device includes a hub and a sleeve mounted on a predetermined rotation shaft between the fifteenth gear and the sixteenth gear.

8. The power train apparatus of the vehicle of claim 7, wherein the fifteenth gear having a clutch gear is rotatably mounted on the predetermined rotation shaft, the clutch gear of the fifteenth gear being selectively engageable with the sleeve of the second transmission device; and wherein the sixteenth gear having a clutch gear is rotatably mounted on the predetermined rotation shaft, the clutch gear of the sixteenth gear being engageable with the sleeve of the second transmission device.

9. The power train apparatus of the vehicle of claim 2, further including a third transmission device fixing the third rotation element of the planetary gear set to the transmission housing or connecting the third rotation element of the planetary gear set to the second shaft.

10. A power train apparatus of a vehicle, the power train apparatus comprising:

a planetary gear set including three rotation elements having a first rotation element, a second rotation element and a third rotation element, wherein the first rotation element is connected to a first shaft and the second rotation element is connected to a second shaft;

a first motor mounted to selectively supply power to the first shaft in two or more gear ratios; and a second motor mounted to selectively supply power to the first shaft in two or more gear ratios, wherein a second transmission device is mounted between the second motor and the first shaft to selectively switch between a state in which the power of the second motor is transferred directly to the first shaft and a state in which the power of the second motor is transferred to the first shaft after being gear-shifted through a gear train, wherein a rotation shaft of the second motor is mounted to be coaxial with the first shaft, wherein the second transmission device includes a hub and a sleeve on the first shaft, wherein a seventh gear having a clutch gear is fixedly mounted on the rotation shaft of the second motor, the clutch gear of the seventh gear being selectively engageable with the sleeve of the second transmission device, and wherein an eighth gear having a clutch gear is rotatably mounted on the first shaft, the clutch gear of the eighth gear being engageable with the sleeve of the second transmission device.

11. The power train apparatus of the vehicle of claim 10, wherein a ninth gear engaged with the seventh gear and a tenth gear engaged with the eighth gear are coaxially connected to each other.

* * * * *